(12) United States Patent
Grusby

(10) Patent No.: US 7,927,648 B2
(45) Date of Patent: Apr. 19, 2011

(54) COMPOSITION AND METHOD FOR ENHANCING EGGS

(75) Inventor: Alan Harvey Grusby, Champaign, IL (US)

(73) Assignee: Archer Daniels Midland Company, Decatur, IL (US)

( * ) Notice: Subject to any disclaimer, the term of this patent is extended or adjusted under 35 U.S.C. 154(b) by 1117 days.

(21) Appl. No.: 11/167,544

(22) Filed: Jun. 27, 2005

(65) Prior Publication Data

US 2006/0003080 A1 Jan. 5, 2006

Related U.S. Application Data

(60) Provisional application No. 60/583,468, filed on Jun. 28, 2004.

(51) Int. Cl.
*A23L 1/32* (2006.01)
*A23L 1/20* (2006.01)
*A23J 1/00* (2006.01)

(52) U.S. Cl. ................ 426/614; 426/656; 426/634

(58) Field of Classification Search .......... 426/614
See application file for complete search history.

(56) References Cited

U.S. PATENT DOCUMENTS

| | | | | |
|---|---|---|---|---|
| 2,571,459 | A * | 10/1951 | Lindsay et al. | 159/48.1 |
| 3,268,335 | A * | 8/1966 | Circle et al. | 426/634 |
| 3,594,192 | A | 7/1971 | Mullen et al. | |
| 3,640,731 | A | 2/1972 | Kaplow et al. | |
| 3,864,500 | A | 2/1975 | Lynn | |
| 3,928,632 | A | 12/1975 | Glaser et al. | |
| 3,930,054 | A | 12/1975 | Liot et al. | |
| 4,120,986 | A * | 10/1978 | Lynn | 426/549 |
| 4,238,519 | A | 12/1980 | Chang et al. | |
| 4,267,100 | A | 5/1981 | Chang et al. | |
| 4,360,537 | A | 11/1982 | Tan et al. | |
| 4,632,903 | A | 12/1986 | Boyce et al. | |
| 5,260,087 | A | 11/1993 | Stad | |
| 5,358,729 | A | 10/1994 | Ohkuma et al. | |
| 5,616,359 | A | 4/1997 | Heidlas et al. | |
| 5,894,027 | A * | 4/1999 | Kazemzadeh | 426/94 |
| 6,140,519 | A * | 10/2000 | Hutton et al. | 554/83 |
| 6,248,375 | B1 * | 6/2001 | Gilles et al. | 426/72 |
| 6,726,951 | B2 | 4/2004 | Campbell et al. | |
| 6,878,394 | B2 * | 4/2005 | Bodor et al. | 426/656 |
| 2001/0009686 | A1 | 7/2001 | Merkle et al. | |
| 2003/0008051 | A1 | 1/2003 | Cavroy et al. | |

FOREIGN PATENT DOCUMENTS

| | | |
|---|---|---|
| CA | 1005688 | 2/1977 |
| CA | 1069756 | 1/1980 |
| CA | 1082981 | 8/1980 |
| CA | 2346177 | 4/2000 |
| CN | 1167584 | 12/1997 |
| CN | 1267460 | 9/2000 |
| EP | 0 012 490 A1 | 6/1980 |
| EP | 0 187 048 A2 | 7/1986 |
| EP | 0 524 751 B1 | 1/1993 |
| EP | 0 615 694 B1 | 9/1994 |
| EP | 0 702 903 B1 | 12/2000 |
| EP | 0 716 811 B1 | 3/2001 |
| EP | 0 837 638 B1 | 12/2002 |
| GB | 1 393 022 | 5/1975 |
| GB | 1 458 160 | 12/1976 |
| GB | 1 468 900 | 3/1977 |
| GB | 1 473 824 | 5/1977 |
| GB | 1 533 084 | 11/1978 |
| GB | 2 076 825 A | 12/1981 |
| JP | 56 055145 A2 | 5/1981 |
| JP | 56 109545 | 8/1981 |
| JP | 58 20172 | 2/1983 |
| JP | 58 89138 | 5/1983 |
| JP | 58 111663 | 7/1983 |
| JP | 60 114145 | 6/1985 |
| JP | 60 137246 A2 | 7/1985 |
| JP | 60 224469 | 11/1985 |
| JP | 60 251859 | 12/1985 |
| JP | 61 28341 | 2/1986 |
| JP | 61 85170 | 4/1986 |
| JP | 62 44148 | 2/1987 |
| JP | 2097365 | 4/1990 |
| JP | 4045740 | 2/1992 |
| JP | 50 76310 A2 | 3/1993 |
| JP | 11 103828 | 4/1999 |
| JP | 2000 139334 | 5/2000 |

(Continued)

OTHER PUBLICATIONS

Deis, R. "Dietary Fiber: A New Beginning" in Food Product Design, Dec. 2001, p. 1-10.*
"Soya—Information about Soy and Soya Products", http://www.soya.be/soy-protein-production.php, 2008.*
Deis, R.C. "Dietary Fiber: A Healthy Discussion" in Food Product Design, Jan. 1999, p. 1-11.*

(Continued)

*Primary Examiner* — Keith D Hendricks
*Assistant Examiner* — Elizabeth Gwartney
(74) *Attorney, Agent, or Firm* — Andrew F. Nilles

(57) ABSTRACT

A blend is provided for enhancing or replacing eggs in foods. The blend, when mixed with natural liquid eggs, liquid egg substitute or whole egg powder and water, provides an edible egg product having a higher level of protein and lower levels of cholesterol and fats per serving than the levels normally found in natural eggs. The blend includes major amounts of a soy protein concentrate and minor amounts of lecithin. The lecithin is preferably a de-oiled lecithin obtained from soy beans. In an alternative embodiment, the blend includes a soluble dietary fiber, such as a digestion resistant maltodextrin soluble dietary fiber, in addition to the soy protein and lecithin. The dietary fiber is present in an amount less than the amount of the soy protein but greater than the amount of lecithin.

12 Claims, No Drawings

FOREIGN PATENT DOCUMENTS

| | | |
|---|---|---|
| KR | 7901617 | 11/1979 |
| WO | WO 86/05362 | 9/1986 |
| WO | WO 92/22220 | 12/1992 |
| WO | WO 96/39873 | 12/1996 |
| WO | WO 00/21375 | 4/2000 |
| WO | WO 00/27225 | 5/2000 |
| WO | WO 02/07541 A1 | 1/2002 |

OTHER PUBLICATIONS

Childs, M.T. and Ostrander, J.; *Egg Substitutes: Chemical and biologic evaluations*; Journal of American Dietetic Association; Mar. 1976; pp. 229-234; vol. 68.

\* cited by examiner

COMPOSITION AND METHOD FOR ENHANCING EGGS

CROSS-REFERENCE TO RELATED APPLICATION

This is a non-provisional application that claims priority under 35 U.S.C. §119 from U.S. patent application Ser. No. 60/583,468 filed on Jun. 28, 2004.

STATEMENT REGARDING FEDERAL SUPPORT

Not Applicable

BACKGROUND

1. Field of the Invention

The invention relates to additives for the enhancement of food products, and in particular, the enhancement or replacement of egg products.

2. Background

Eggs, eaten alone or as an ingredient in many different food products and recipes, are a dietary staple. Eggs are used as thickeners in sauces, puddings and custards, binding agents to hold ingredients together, emulsifiers to stabilize oil in water emulsions, foaming agents to add air cells for lighter, airier products, or as coatings to lock in flavor in fried foods or to brown the surface of baked goods. Eggs also prevent the formation of sugar and the formation of ice crystals, allowing ice creams, sherbets and chocolate to stay smooth.

Although eggs are a relatively low calorie source of protein and have a wide range of vitamins and minerals in proportion to their calorie count, they are known to be high in cholesterol. For example, a 75-calorie whole raw chicken egg (about 59 grams) contains more than 6 grams of protein and about 213-280 mg cholesterol. One of the highest sources of cholesterol is the egg yolk. The table below shows the nutrient breakdown for a typical large raw egg.

TABLE I

ASSAYED NUTRIENT VALUES FOR A LARGE RAW EGG*
Based on 59 g. shell weight with 50 g. total liquid whole egg,
33.4 g. white and 16.6 g. yolk

| NUTRIENT AND UNIT | WHOLE | WHITE | YOLK |
|---|---|---|---|
| Approximate | | | |
| Water | 37.66 | 29.33 | 8.10 |
| Food energy-calories. | 75 | 17 | 59 |
| Protein (N × 6.25)-g. | 6.25 | 3.52 | 2.78 |
| Total lipid-g. | 5.01 | — | 5.12 |
| Total carbohydrate-g. | .61 | .34 | .30 |
| Ash-g. | .47 | .21 | .29 |
| Lipids | | | |
| Fatty acids as triglycerides-g. | 4.327 | — | 4.428 |
| Saturated-total | 1.550 | — | 1.586 |
| 8:0 Caprylic | .002 | — | .002 |
| 10:0 Capric | .002 | — | .002 |
| 12:0 Lauric | .002 | — | .002 |
| 14:0 Myristic | .017 | — | .017 |
| 16:0 Palmitic | 1.113 | — | 1.139 |
| 18:0 Stearic | .392 | — | .401 |
| 20:0 Arachidic** | .020 | — | .020 |
| Monounsaturated-total | 1.905 | — | 1.949 |
| 14:1 Myristoleic** | .005 | — | .005 |
| 16:1 Palmitoleic | .149 | — | .152 |
| 18:1 Oleic | 1.736 | — | 1.776 |
| 20:1 Eicosenoic | .014 | — | .014 |
| 22:1 Erucic | .002 | — | .002 |
| Polyunsaturated-total | .682 | — | .698 |
| 18:2 Linoleic | .574 | — | .587 |
| 18:3 Linolenic | .017 | — | .017 |
| 20:4 Arachidonic | .071 | — | .073 |
| 20:5 Eicosapentaeonic | .002 | — | .002 |
| 22:6 Docosahexaenoic | .018 | — | .019 |
| Cholesterol-mg. | 213 | — | 213 |
| Lecithin-g.** | 1.15 | — | 1.11 |
| Caphalin-g.** | .23 | — | .219 |
| Vitamins | | | |
| A-IU | 317 | — | 323 |
| D-IU** | 24.5 | — | 24.5 |
| E-mg. | .70 | — | .70 |
| B12-mcg. | .50 | .07 | .52 |
| Biotin-mcg.** | 9.98 | 2.34 | 7.58 |
| Choline-mg.** | 215.06 | .42 | 215.97 |
| Folic Acid (Folacin)-mcg | 23 | 1 | 24 |
| Inositol-mg.** | 5.39 | 1.38 | 3.95 |
| Niacin-mg (B3) | .037 | .031 | .002 |
| Pantothenic acid-mg | .627 | .04 | .632 |
| Pyridoxine (B6)-mg. | .070 | .001 | .065 |
| Riboflavin (B2)-mg. | .254 | .151 | .106 |
| Thiamine (B1)-mg. | .031 | .002 | .028 |
| Minerals-mg. | | | |
| Calcium | 25 | 2 | 23 |
| Chlorine** | 87.1 | 60.0 | 27.1 |
| Copper | .007 | .002 | .004 |
| Iodine** | .024 | .001 | .022 |
| Iron | .72 | .01 | .59 |
| Magnesium | 5 | 4 | 1 |
| Manganese | .012 | .001 | .012 |
| Phosphorus | 89 | 4 | 81 |
| Potassium | 60 | 48 | 16 |
| Sodium | 63 | 55 | 7 |
| Sulfur* | 82 | 56 | 25 |
| Zinc | .55 | — | .52 |
| Amino Acids-g. | | | |
| Alanine | .348 | .203 | .143 |
| Arginine | .375 | .191 | .199 |
| Aspartic acid | .628 | .358 | .272 |
| Cystine | .145 | .091 | .050 |
| Glutamic acid | .816 | .467 | .353 |
| Glycine | .210 | .123 | .086 |
| Histidine | .148 | .079 | .072 |
| Isoleucine | .341 | .199 | .141 |
| Leucine | .534 | .296 | .244 |
| Lysine | .449 | .239 | .221 |
| Methionine | .195 | .121 | .069 |
| Phenylalanine | .332 | .205 | .119 |
| Proline | .249 | .137 | .116 |
| Serine | .465 | .242 | .238 |
| Threonine | .300 | .160 | .148 |
| Tryptophan | .076 | .043 | .033 |
| Tyrosine | .255 | .137 | .124 |
| Valine | .381 | .224 | .155 |

*As reported in the 1989 Supplement-Agriculture Handbook No. 8, Human Nutrition Information Service, USDA.
**As reported in 1979 Poultry Science, vol. 58: 131-134.

With the ever increasing number of people with coronary artery disease in the United States and other developed industrial nations, health care professionals have for a long time advocated diets low in fat and cholesterol content.

The food industry has responded to the need to reduce fat and cholesterol by developing liquid and dry egg substitutes and egg yolk replacements. Several commercial brands are available. At the same time, the diet industry is promoting diets high in protein and low in carbohydrates for weight loss. In 1999, the U.S. Food and Drug Administration (FDA)

announced that incorporating soy protein into the daily diet helps to fight heart disease, the number one cause of death in the United States. FDA recommends that adults incorporate four servings of at least 6.25 grams of soy protein into their daily diets, a total of at least 25 grams. According to the FDA standards, consuming 25 grams of soy protein each day, coupled with a diet low in cholesterol and fats, may reduce heart disease.

Still other health care professionals advocate diets high in fiber. In the United States, people consume only about half of the recommended daily amount of dietary fiber, about 25-35 grams.

Finding foods that can satisfy all of these guidelines—low fat and cholesterol content, and high protein and high dietary fiber content—is difficult.

SUMMARY

There has been developed an additive for enhancing certain nutritional aspects of egg products and foods that contain or are made with eggs. The additive can be used, for example, as an additive to liquid eggs, including liquid natural eggs and liquid egg substitutes. In this embodiment, the additive is a blend comprising major amounts of a soy protein and minor amounts of lecithin. The soy protein may, for example, be a non-modified soy protein concentrate derived from whole soybeans. The soy protein may be alcohol washed protein. The lecithin may be derived from soybean oil and may preferably be de-oiled lecithin.

In another embodiment, the additive blend may further include a soluble dietary fiber, such as a vegetable fiber derived, for example, from corn or potatoes. The fiber may, for example, be a digestion resistant soluble fiber. The fiber is preferably present in an amount greater than the amount of lecithin and less than the amount of soy protein in the blend.

In another embodiment, a product may be provided that includes egg nutrient, such as whole egg powder, natural whole eggs, a liquid egg substitute or a synthetic source of egg nutrients, and one of the embodiments of the blend described above.

The product may comprise only dry ingredients, including whole egg powder, soy protein and lecithin, or may be provided with added water for use as a liquid egg product. In this embodiment, the major component is the whole egg powder. The soy protein, which may be a soy protein concentrate, is present in this embodiment, in an amount less than the amount of the whole egg powder. The lecithin is present in an amount less than the amount of the soy protein. In this embodiment, the whole egg powder may comprise from about 40 to about 70 weight % of the total content of the blend and the combination of the soy protein, lecithin and water may comprise from about 30 to 60 weight % of the total content of the blend.

The product blend may further include a soluble fiber, which may be present in an amount less than the amount of soy protein and more than the amount of lecithin present in the blend. In this embodiment, the whole egg powder may be present in an amount ranging from 40 to 60 weight % of the total blend and the combination of added water, soy protein, lecithin and fiber may be present in an amount from 40 to 60 weight % of the total blend.

There is also provided an egg replacement product comprising a source of egg nutrient selected from the group consisting of whole egg powder, liquid egg and combinations thereof, a blend comprising soy protein, an amount of a soluble dietary fiber less than the amount of soy protein and an amount of lecithin less than the amount of the fiber, and added water. The egg nutrient is present in an amount ranging from 30 to 70 weight % of the egg product and the water is present, prior to cooking, in an amount sufficient to comprise with the blend, about 30 to 70 weight % of the egg product.

There is also provided a method for enhancing egg products. The method includes adding to liquid eggs or a liquid egg substitute, a blend comprised of major amounts of soy protein and minor amounts of lecithin, mixing the blend with the liquid to produce a mixture. The mixture increases the protein content and decreases the percentage of fat and cholesterol content of the egg product by dilution.

DETAILED DESCRIPTION

A blend is provided for enhancing egg products. In one embodiment, the blend, when used as an additive to liquid eggs or powdered whole eggs and water, provides an edible product having a higher level of protein and lower levels of cholesterol and fats per serving than the levels normally found in natural eggs. The blend includes soy protein and lecithin, generally in a dry form. In an alternative embodiment, the blend includes a soluble dietary fiber in addition to the soy protein and lecithin.

The products and egg replacement products resulting from use of the blends as additives to liquid eggs, or replacement of natural eggs, have been found to be highly palatable and organoleptically similar to natural eggs in color, texture and odor. The egg enhancement blend, optionally with added water, may be added to liquid eggs to increase the protein content and decrease the cholesterol and fat content per serving of the final product. In the embodiment of the blend containing soluble dietary fiber, the products made with the additive blend also have a higher fiber content per serving than would be found with natural eggs. These products also typically include added water. If sufficient fiber is added to the blend to yield a finished product having more than 2.5 grams of fiber per serving, it may be designated as a "good source of fiber" under regulations issued by the FDA.

In another embodiment, the blend may be combined with whole egg powder to provide and enhanced egg replacement product. When mixed with added water, an enhanced liquid egg replacement product is provided that can be used in place of natural liquid eggs. Commercially available whole egg powders are typically pasteurized so their use with the egg replacement product significantly reduces, if not eliminates, the potential for bacterial contamination inherent in the use of raw eggs. When soluble fiber forms part of this blend, the product provides more protein and fiber with less cholesterol and fat per serving than a natural egg product. The product may be used without added water, in its dry form, in some applications.

Natural eggs or naturally occurring eggs, as used herein, refers to edible, shelled eggs from egg laying chickens, turkeys, duck, goose, pheasant, partridge, grouse, pea fowl and guinea fowl, pigeons, emus, rhea and ostrich.

Liquid egg, as used herein refers to the liquid content of naturally occurring eggs, including the egg white and yolk, and liquid egg substitutes, such as those sold commercially under the mark EGGBEATERS®.

Egg nutrients, as used herein refers to natural eggs, liquid eggs, whole egg powders, any synthetic blend comprised of nutrients generally approximating those found in natural whole eggs, egg whites or egg yolks, or combinations of any of the foregoing. Generally approximating means that some components of naturally occurring egg nutrients may be excluded, such as trace components, components that are undesirable for an intended application (such as cholesterol) and the like.

Soybeans, which have no cholesterol and are very low in sodium, are a good source of dietary fiber, protein, thiamine, niacin, calcium, iron, manganese, phosphorous, potassium, Vitamin C and folate. For example, a one cup serving of raw green soybeans (about 256 grams) provides 376 calories, of which 146 are from fat, including about 2 grams of saturated fat. A serving size of soybeans has about 33 grams protein, 28 grams carbohydrates (including about 11 grams of dietary fiber) and 17 grams total fat.

The soy protein of the blend may be a non-modified soy protein concentrate derived from 100% whole soybeans. Concentrates are defined herein to contain greater than 65% protein. While protein isolates (defined to contain greater than 90% protein) may be useful in some applications, in many applications the isolates produce very gummy products. The soy protein selected for use in the blend preferably has not been chemically modified. The soy protein contains a full complement of amino acids and preferably between 65-75% protein, and more preferably, between 70-72% protein. In one embodiment, the protein may be an alcohol washed soy protein. In the process of preparing the soy protein concentrate, the alcohol used in the wash is burned off. The alcohol burn off advantageously removes any bean odor or flavor that might adversely affect the taste or smell of the enhanced egg product. The soy protein useful in the egg enhancement blend is commercially available from Archer Daniels Midland, sold under the mark, ARCON®-S. Other sources of soy protein concentrate are commercially available and may be used.

TABLE II

Nutritional Information
ARCON ® S

| NUTRIENT | PERCENT | * |
|---|---|---|
| Moisture, maximum | 8 | (1) |
| Protein (Nx6.25), mfb | 72 | (1) |
| Protein (Nx6.25), as is, min | 66 | (1) |
| Ash | 5 | (1) |
| Fat (acid hydrolysis) | 3 | (1) |
| Total Dietary Fiber (minimum 95% insoluble) | 20 | (1) |
| Total Carbohydrates | 21 | (1) |
| Energy (calories/100 g) | 290 | (2) |
| PDCAAS | 1.0 | (4) |

| NUTRIENT | mg per 100 g | * |
|---|---|---|
| Vitamin A (I.U.) | trace | (3) |
| Vitamin C | trace | (3) |
| Thiamine | trace | (3) |
| Niacin | trace | (3) |
| Vitamin D | trace | (3) |
| Vitamin E | trace | (3) |
| Vitamin B6 | trace | (3) |
| Vitamin B12 (μg) | trace | (3) |
| Folic Acid | trace | (3) |
| Biotin | trace | (3) |
| Vitamin K | trace | (3) |
| Pantothenic Acid | trace | (3) |
| Riboflavin | trace | (3) |
| Sodium | 1200-1600 | (1) |
| Potassium | 75-300 | (1) |
| Phosphorus | 800-1200 | (1) |
| Magnesium | 25-100 | (1) |
| Calcium | 50-150 | (1) |

TABLE II-continued

Nutritional Information
ARCON ® S

| Iron | 8-13 | (1) |
|---|---|---|
| Zinc | 3-6 | (1) |
| Copper | <2 | (1) |
| Manganese | <5 | (1) |
| Selenium | N/A | — |
| Chromium | N/A | — |
| Molybdenum | N/A | — |
| Iodine | N/A | — |
| Fluoride | <1 ppm | (3) |
| Sulfites | <10 ppm | (1) |
| Chloride | 350 | (3) |
| Fatty Acids (based on fat by acid hydrolysis) | 0.6% | (3) |
| Cholesterol | 0 | (3) |
| Caffeine | 0 | (3) |
| Alcohol | 0 | (3) |
| Sugars | 1% | (1) |
| Mercury | <0.05 ppm | (1) |
| Arsenic | <0.5 ppm | (1) |
| Cadmium | <0.1 ppm | (1) |
| Lead | <0.5 ppm | (1) |

* (1) = Actual analysis
(2) = Calculated
(3) = From database
(4) = Calculated based on corrected amino acids scores (from actual analysis) using protein digestibility of .95 FAO/WHO, 1989
N/A = No data available
Protein, carbohydrates, and fat are all of soybean origin.

| GRANULATION | TYPICAL AMINO ACIDS (gm/100 gm protein) | | MICROBIOLOGICAL DATA | |
|---|---|---|---|---|
| Fine powder | Aspartic Acid | 11.9 | Standard Plate Count, max | 10,000/gm |
| | *Threonine | 4.2 | Salmonella (class III) | Negative |
| | Serine | 5.1 | E. Coli | Negative |
| | Glutamic Acid | 19.0 | | |
| | Proline | 5.6 | | |
| | Glycine | 4.6 | | |
| | Alanine | 4.6 | | |
| | Cystine | 1.4 | | |
| | *Valine | 5.4 | | |
| | *Methionine | 1.5 | | |
| | *Isoleucine | 5.2 | | |
| | *Leucine | 8.5 | | |
| | Tyrosine | 4.0 | | |
| | *Phenylalanine | 5.4 | | |
| | *Histidine | 2.8 | | |
| | *Lysine | 6.9 | | |
| | Arginine | 7.9 | | |
| | *Tryptophan | 1.2 | | |
| | *Essential Amino Acids | | | |

This product is kosher and pareve, bears the O.U. symbol of certification, and is Halal certified.

The lecithin used in the blend is, in one embodiment, a de-oiled lecithin, such as that prepared by the method described in U.S. Pat. No. 6,140,519, which is hereby incorporated herein by reference. The method for producing food grade de-oiled lecithin does not use acetone as the solvent to avoid possible toxicity associated with acetone and the bad residual taste imparted when acetone is used in the de-oiling process. The method for de-oiling without acetone includes mixing crude lecithin with an alkane; separating triglycerides from phosphatides through a membrane; obtaining a retentate following separation; decolorizing the retentate with bleaching earth or with carbon, activated carbon or other chemical bleaching means; and evaporating the alkane from the retentate. The product may further be granulated in a powder agglomerator. The crude lecithin may be from a vegetable selected from the group consisting of soybean, corn, cottonseed, linseed, peanut, canola, rapeseed, safflower and sunflower.

The lecithin used in the blend is, in one embodiment, derived entirely from soybean oil. One commercial source of the lecithin derived from soybean oil is sold by Archer Daniels Midland under the mark, ULTRALEC®-P. Other sources of lecithin are commercially available. The table below is exemplary of the nutritional data for the de-oiled lecithin, and in particular for the ULTRALEC®-P brand of lecithin.

TABLE III

LECITHIN - NUTRITIONAL DATA for ULTRALEC ™ P/F/G

| Nutrient | Amount per 100 grams |
|---|---|
| Calories (kcal) | 700 |
| Calories from fat (kcal) | 480 |
| Total Fat (g)[1] | 53 |
| Saturated (g) | 13 |
| Monosaturated (g) | 5 |
| Polyunsaturated (g) | 35 |
| Linoleic (g) | 29 |
| Linolenic (g) | 6 |
| Cholesterol (mg) | 0 |
| Sodium | 11 |
| Total Carbohydrates (g) | 8 |
| Dietary fiber | 0 |
| Sugars (g) | 4 |
| Protein (g) | trace |
| Choline (g) | 3 |
| Vitamin A | * |
| Vitamin C | * |
| Moisture (g) | <1 |
| Calcium (mg) | 140 |
| Iron (mg) | 4 |
| Potassium (mg) | 1600 |
| Phosphorus (mg) | 3000 |
| Thiamine (µg) | * |
| Riboflavin | * |
| Niacin | * |
| Folic Acid | * |
| Vitamin E (mg) | 6 |
| Vitamin B12 (µg) | * |
| Phosphatidylcholine (%) | 23 |
| Phosphatidylethanolamine (%) | 20 |
| Phosphatidylinositol (%) | 14 |
| Phosphatidic Acid (%) | 8 |

[1]Total Fatty Acids expressed as triglycerides.
*Contains less than 2% of the U.S. RDA of these nutrients.
Information from database and analytical sources is believed to be accurate as typical values of de-oiled lecithin.

Lecithin is useful to prevent, or at least reduce, clumping in the blend. In addition, lecithin helps to reduce dusting when liquids are combined with the dry blend. In commercial scale operations, the clouds of dust created when liquids are poured into open containers of fine powder can be hazardous. At a minimum, it results in loss of ingredients. The added lecithin in the dry blend acts as an emulsifier and significantly reduces such clouds of dust.

The fiber used in some embodiments of the blend may be a water-soluble dietary fiber, such as a vegetable fiber, such as those derived from corn or potatoes. In one embodiment, the fiber is derived entirely from corn. For example, the fiber may preferably be a digestion resistant maltodextrin soluble dietary fiber. The fiber used in this embodiment is a by-product of the removal of cornstarch, cornflower and corn dextrose from corn.

Corn and potato starches are readily hydrolyzed by acid or enzyme to shorter chain carbohydrates composed of glucose units. Completely hydrolyzed starch will yield glucose and intermediate products such as glucose syrups, maltodextrins, dextrins and modified starch. Dextrins are made by hydrolyzing starches in a dry state by the addition of acid and heat. The heating process causes glucose to recombine with the larger carbohydrates. Additional heating produces highly branched carbohydrates or pyrodextrins. The pyrodextrins are further hydrolyzed with enzyme treatments to make a very highly branched product with properties like a maltodextrin, but almost completely indigestible. This indigestible product is very water soluble but has digestion properties like fiber. Indigestible dextrin obtained from potato starch is sold under the marks, PINEFIBER™ and PINEFIBER C™. Indigestible dextrin obtained from corn starch is sold under the marks FIBERSOL 1™ and FIBERSOL-2™ by Matsutani America, Inc. Digestion resistant fibers are also commercially available in a low density material called Dexflow or Pineflow. All of these materials have similar properties and are referred to herein generically as digestion resistant soluble fibers.

FIBERSOL-2™ digestion resistant soluble fiber has properties similar to a maltodextrin and has attained GRAS status from the US FDA as a maltodextrin. FIBERSOL-1™ digestion resistant soluble fiber has been granted status as a dextrin. FIBERSOL-2™ is a rich source of water soluble dietary fiber, consistent with the American Association of Cereal Chemists (approved September 2000) and the Food and Nutritional Board of the national Academy of Sciences (published September 2001) definitions of dietary fiber.

The table below provides nutritional information for an exemplary dietary fiber, and in particular, the fiber sold under the mark, FIBERSOL-2™.

TABLE IV

NUTRITIONAL INFORMATION
FIBERSOL-2 ™ Dietary Fiber

| Nutrient | Nutrient Quantity/ 100 grams of Ingredient |
|---|---|
| Total Calories | 380 Kcal |
| Calories from Fat | 0 Kcal |
| Calories from Saturated Fat | 0 Kcal |
| Total Fat | 0 g |
| Saturated Fat | 0 g |
| Polyunsaturated Fat | 0 g |
| Monounsaturated Fat | 0 g |
| Cholesterol | 0 mg |
| Sodium | 1 mg |
| Potassium | 0 mg |
| Total Carbohydrate | 95.0 g |
| Dietary Fiber | 90.0 g |
| Soluble Fiber | 90.0 g |
| Insoluble Fiber | 0 g |
| Sugars | 5.0 g |
| Sugar Alcohol | 0 g |
| Other Carbohydrate | 0 g |
| Protein | 0 g |
| Vitamin A | 0 IU |
| Vitamin C | 0 mg |
| Calcium | 0 mg |
| Iron | 0 mg |

| OTHER ESSENTIAL VITAMINS AND MINERALS (per 100 grams) | | | |
|---|---|---|---|
| Thiamine | 0 mg | Phosphorus | 0.48 mg |
| Riboflavin | 0 mg | Iodine | 0 mg |
| Niacin | 0 mg | Magnesium | 0.07 mg |
| Vitamin D | 0 IU | Zinc | 0 mg |
| Vitamin E | 0 IU | Copper | 0.01 mg |
| Vitamin B-6 | 0 mg | Biotin | 0 mg |
| Folic Acid | 0 mg | Pantothenic Acid | 0 mg |
| Vitamin B-12 | 0 mg | | |

TABLE IV-continued

NUTRITIONAL INFORMATION
FIBERSOL-2 ™ Dietary Fiber

PHYSICAL CHARACTERISTICS:

| | |
|---|---|
| Appearance | Off-white powder, clear, transparent in 10% solution |
| Taste/Odor | No flavor, clean/Odorless |
| Solubility | Water soluble up to 70% (w/w) @ 20 C |
| Stability | Acid, heat/retort processing, and freeze/thaw stable |
| Viscosity | Very low, 15 cps, 30% solution @30 C |
| Sweetness | Low, no sweetness (<10% of sucrose @ 30% T.S.) |
| Bulk Density | Approximately 0.48 g/ml (30 lbs. per cubic foot) |

TYPICAL CHEMICAL PROPERTIES:

| | |
|---|---|
| Water Soluble Dietary Fiber | 90% minimum DSB, in accordance with AOAC method #2001.03* |
| Moisture | 5% maximum |
| Dextrose Equivalent (D.E.) | 8.0 to 12.5 |
| pH | 4.0 to 6.0 |
| Ash | 0.2% maximum |
| Heavy Metals (as lead) | 5.0 ppm maximum |
| Arsenic | 1.0 ppm maximum |

An exemplary egg enhancement product may include about 50% whole natural eggs, 40-42% water and 8-10% of the egg enhancer blend. The blend may include, for example, 90-95%, and preferably 92-94% soy protein and 5-10%, preferably 6-8% lecithin; or 67-72%, preferably 68-70% soy protein, 23-27%, preferably 24-26% dietary fiber and 1-10%, preferably 4-6% lecithin. An exemplary egg replacement product may include about 75-85% water and 15-25% egg replacement blend (including whole egg powder), and preferably about 80-83% water and 17-20% egg replacement blend (including whole egg powder). In this embodiment, the egg replacement blend may include for example, 45-50%, preferably 46-48% whole egg powder, 40-48%, preferably 44-46% soy protein and from 2-15%, preferably 6-10% lecithin; or 38-42% whole egg powder, 38-42% soy protein, 4-8% lecithin and 10-17% dietary fiber. Exemplary egg enhancement and replacement products, with and without added dietary fiber, are set forth in the Table below.

TABLE V

EGG ENHANCER AND EGG REPLACER BLEND AND PRODUCT FORMULATIONS

| EGG ENHANCER Blend - 1 INGREDIENT | PERCENT | EGG ENHANCER PRODUCT FORMULATION 1 INGREDIENT | PERCENT |
|---|---|---|---|
| Soy Protein | 93.00 | Whole Eggs | 50.00 |
| Lecithin | 7.00 | Water | 41.66 |
| TOTAL | 100.00 | Egg Enhancer Blend 1 | 8.34 |
| | | TOTAL | 100.00 |

| EGG ENHANCER Blend - 2 INGREDIENT | PERCENT | EGG ENHANCER PRODUCT FORMULATION 2 INGREDIENT | PERCENT |
|---|---|---|---|
| Soy Protein | 69.06 | Whole Eggs | 50.00 |
| Dietary Fiber | 25.78 | Water | 41.66 |
| Lecithin | 5.16 | Egg Enhancer Blend 2 | 8.34 |
| TOTAL | 100.00 | TOTAL | 100.00 |

| EGG REPLACER Blend - 1 INGREDIENT | PERCENT | EGG REPLACER PRODUCT FORMULATION 1 INGREDIENT | PERCENT |
|---|---|---|---|
| Whole Egg Powder | 47.06 | Water | 82.70 |
| Soy Protein | 45.88 | Egg Replacer Blend 1 | 17.30 |
| Lecithin | 7.06 | TOTAL | 100.00 |
| TOTAL | 100.00 | | |

| EGG REPLACER Blend - 2 INGREDIENT | PERCENT | EGG REPLACER PRODUCT FORMULATION 2 INGREDIENT | PERCENT |
|---|---|---|---|
| Whole Egg Powder | 40.40 | Water | 81.41 |
| Soy Protein | 39.40 | Egg Replacer Blend 2 | 18.59 |
| Dietary Fiber | 14.14 | TOTAL | 100.00 |
| Lecithin | 6.06 | | |
| TOTAL | 100.00 | | |

The estimated nutritional breakdown for each blend of Table V is shown in the Table below.

TABLE VI

NUTRITIONAL ESTIMATES

| | EGG REPLACER - Blend 1 | EGG REPLACER - Blend 2 | EGG ENHANCER - Blend 1 | EGG ENHANCER - Blend 2 |
|---|---|---|---|---|
| % FAT | 24.00% | 21.00% | 7.00% | 5.00% |
| | (Mg per 100 G) | | | |
| Sodium | 500-1000 | 480-1500 | 1100-1500 | 840-1150 |
| Potassium | 34-380 | 30-550 | 70-280 | 50-200 |
| Phosphorus | 350-950 | 320-800 | 740-1150 | 550-840 |
| Magnesium | 10-70 | 10-60 | 20-100 | 15-80 |
| Calcium | 45-250 | 20-150 | 45-140 | 35-100 |
| Iron | 3-9 | 3-8 | 3-5 | 5-10 |
| Zinc | 1-8 | 1-5 | 1-3 | 2-5 |
| Copper | <2 | <2 | <2 | <2 |
| Manganese | <5 | <5 | <5 | <5 |
| Fluoride | <1 PPM | <1 PPM | <1 PPM | <1 PPM |
| Sulfites | <10 PPM | <10 PPM | <10 PPM | <10 PPM |
| Chloride | 325 | 140 | 325 | 325 |
| Mercury | <0.05 PPM | <0.05 PPM | <0.05 PPM | <0.05 PPM |
| Arsenic | <0.5 PPM | <0.5 PPM | <0.5 PPM | <0.5 PPM |

TABLE VI-continued

NUTRITIONAL ESTIMATES

|  | EGG REPLACER - Blend 1 | EGG REPLACER - Blend 2 | EGG ENHANCER - Blend 1 | EGG ENHANCER - Blend 2 |
|---|---|---|---|---|
| Cadmium | <0.1 PPM | <0.1 PPM | <0.1 PPM | <0.1 PPM |
| Lead | <0.5 PPM | <0.5 PPM | <0.5 PPM | <0.5 PPM |
| Vitamin A | 423 IU | 360 IU | trace | trace |
| Vitamin B-12 | 2.00 | 1.58 | trace | trace |
| Vitamin E | 0.42 | 0.42 | 0.42 | 0.42 |
| Cholesterol | 810 | 686 | trace | trace |
| Thiamin | 0.100 | 0.078 | trace | trace |
| Pyridoxine | 0.190 | 0.155 | trace | trace |
| Folic acid | 0.080 | 0.068 | trace | trace |
| Niacin | 0.143 | 0.122 | trace | trace |
| Riboflavin | 0.730 | 0.620 | trace | trace |
| Pantothenic acid | 2.780 | 2.360 | trace | trace |
| Dietary fiber |  | 2.60 grams |  | 23.40 grams |

Example 1

Table VII shows the formulations for six egg replacement blends and two control blends. Pasteurized whole egg powder was obtained from a commercial source, in this case, Cutler Egg Products. The samples to be used for testing were measured in varying amounts, as shown in Table VII, and placed in labeled containers. Three different dry blends, each comprised of the whole egg powder, soy protein (S) and lecithin (L), were prepared by weighing each ingredient and combining the ingredients together. Three additional, different, dry blends, each comprised of the whole egg powder, soy protein (S), lecithin (L) and a digestion resistant soluble dietary fiber (F) were prepared, again by weighing each ingredient and combining the ingredients together. The controls were made of 100% whole egg powder. A preliminary test to determine how well the dry ingredients blended was done. The dry ingredients were observed to blend together well, with no separation of ingredients. Although the dry ingredients may be combined in any order, it has been found to be advantageous to add the lecithin to the soy protein. The fiber, if used, may be added next or the whole egg powder may be added after the lecithin or after the fiber.

After the dry ingredients (protein, lecithin, egg powder and dietary fiber, when used) for each sample were added together, each sample was blended with water for about ten seconds in a laboratory Robot-Coupe® mixer. Any suitable known mixer capable of blending dry and liquid ingredients will suffice. A plastic spatula was used to scrape down the sides of the mixer to avoid loss of ingredients. Each sample of dry blend and the water were blended together for one minute, and then dispensed into a labeled beaker.

The blends 1, 2, 3, 4, 5, 6, and 7 exhibited a much higher viscosity than the controls. To achieve viscosities similar to the viscosity of the controls, 100 grams of water was added to each blend sample. Each sample and the controls were blended again for an additional minute. Each blended sample was dispensed into its previously labeled beaker. The viscosity test was repeated to ensure at least visual similarity with the viscosity exhibited by the controls. The ratio of water to the dry ingredients used in the examples is set forth in Table VII. Generally, however, the blend may be hydrated in a ratio of about 4:1 to about 5:1 water to dry ingredients.

Each mixture was cooked separately on a pre-heated grill at 350° F. (177° C.) for two minutes to make scrambled egg sample portions. After cooking, each scrambled egg portion was placed in a pre-labeled container, weighed, and covered with aluminum foil to keep the sample warm.

TABLE VII

Egg Replacer Formulations

| WHOLE EGG POWDER BLENDS | 1 | 2 | 3 | 4 | 5 | 6 | 7 | 8 |
|---|---|---|---|---|---|---|---|---|
| Enhanced - S & L | 40% - E | 50% - E | 60% - E | Control |  |  |  |  |
| Enhanced - S, L & F |  |  |  |  | 40% - E | 50% - E | 60% - E | Control |
| DryBlend | % | % | % | % | % | % | % | % |
| Whole Egg Powder | 66.67% | 57.13% | 47.06% | 100.00 | 60.00% | 50.24% | 40.40% | 100.00 |
| Soy Protein[1] (S) | 28.89% | 37.16% | 45.88% |  | 26.00% | 32.68% | 39.40% |  |
| Dietary Fiber[2] (F) |  |  |  |  | 10.00% | 12.06% | 14.14% |  |
| Lecithin[3] (L) | 4.44% | 5.71% | 7.06% |  | 4.00% | 5.02% | 6.06% |  |
| Total Dry Powder | 100.00 | 100.00 | 100.00 | 100.00 | 100.00 | 100.00 | 100.00 | 100.00 |
| Hydration: | 4.47:1 | 4.63:1 | 4.78:1 | 3.00:1 | 4.24:1 | 4.31:1 | 4.38:1 | 3.00:1 |
| Water (g) | 447.00 | 463.00 | 478.00 | 300.00 | 424.00 | 431.00 | 438.00 | 300.00 |
| Total Weight (g) | 547.00 | 563.00 | 578.00 | 400.00 | 524.00 | 531.00 | 538.00 | 400.00 |

[1]Obtained from Archer Daniels Midland, ARCON ® soy protein.
[2]Digestion resistant maltodextrin soluble dietary fiber obtained from Matsutani America, Inc., FIBERSOL ® fiber.
[3]Obtained from Archer Daniels Midland, ULTRALEC ® lecithin.
E Enhanced All of the finished scrambled eggs from the samples identified in Table VII looked very similar and had a very similar flavor and texture. However, the scrambled eggs produced from the control samples 4 and 8, stuck to the grill significantly, whereas the scrambled eggs made from samples 1-3 and 5-7 did not.

Example 2

The blend of samples 2 and 6 of Table VII were tested in bakery products; specifically in a cake mix. Both blends selected for bakery testing represent approximately a 50% replacement of egg powder. A control sample of 100% pasteurized powdered whole eggs was provided. Samples 2 and 6, as shown in Table VIII, include the same ingredients as Samples 2 and 6 in Table VII and are hydrated to the same extent, with sample 2 having a water to dry ingredients ratio of 4.63:1 and sample 6 having a water to dry ingredients ratio of 4.31:1.

TABLE VIII

EGG REPLACEMENT BAKERY TEST

EGG REPLACER DRY MIX ≅ 50% ENHANCED

| Sample 2 | % | GRAMS | Sample 6 | % | GRAMS |
|---|---|---|---|---|---|
| WHOLE EGG POWDER | 57.13 | 685.56 | WHOLE EGG POWDER | 50.24 | 602.88 |
| SOY PROTEIN | 37.16 | 445.92 | SOY PROTEIN | 32.68 | 392.16 |
| LECITHIN | 5.71 | 68.52 | LECITHIN | 12.06 | 144.72 |
|  |  |  | FIBER | 5.02 | 60.24 |
|  | 100.00 | 1200.00 |  | 100.00 | 1200.00 |
| HYDRATION | 4.63:1 |  | HYDRATION | 4.31:1 |  |

The hydrated blends were used in place of whole natural eggs in the following recipe for yellow cake. The ingredients set forth in Table IX were mixed together and then 400 gram portions were placed into 8 inch round cake pans. Three pans were prepared and baked for each of the three test samples (the control and egg replacement formulation samples 2 and 6). The pans containing the three samples of the cake mix formulation, i.e., the mix containing the control powdered whole eggs, the mix containing sample 2 in place of the whole eggs and the mix containing sample 6 in place of the whole eggs, were placed in an oven, pre-heated to 365° F. (185° C.) and baked for 23 minutes. The cakes were removed from the oven and allowed to cool for 30 minutes before they were removed from the pans and observed for color, texture, spring, specific gravity and taste.

TABLE IX

YELLOW CAKE FORMULATION

| INGREDIENT | GRAMS | PERCENT |
|---|---|---|
| Shortening | 254.92 | 9.68 |
| Cake Flour | 567.00 | 21.54 |
| Granular Sugar | 623.70 | 23.69 |
| Nonfat Dry Milk Powder | 56.70 | 2.15 |
| Baking Powder | 42.18 | 1.60 |
| Baking Soda | 3.63 | 0.14 |
| Salt | 21.32 | 0.81 |
| Pre-gel Wheat Starch | 28.35 | 1.08 |
| Water - 1 | 396.90 | 15.08 |
| Whole Eggs | 510.30 | 19.38 |
| Flavor | 14.06 | 0.53 |
| Water - 2 | 113.40 | 4.31 |
| TOTAL | 2632.46 | 100.00 |

TABLE X

EXPERIMENTAL RESULTS

| TEST | SPECIFIC GRAVITY | BAKED CAKE VOLUME MEASUREMENT |
|---|---|---|
| 1 | 0.90 | 68 mm 80 mm 74 mm |
| 2 | 0.93 | 60 mm 69 mm 64 mm |
| 3 | 0.98 | 62 mm 70 mm 64 mm |

It was observed that each cake mixed well and had good volume and oven spring as determined by touch. The control cake seemed to have the best body and least fall back (which means the ability to return to its original shape). It retained its volume the best of the three. Cakes from tests 2 and 3 (sample formulations 2 & 6, respectively) seemed to be more delicate in crumb structure, but did not have excessive shrinkage. The crumb color was similar for all three of the cake samples. Notably, as shown in Table X, the specific gravities for the three test samples were substantially the same. Specific gravity is an excellent indicator of the air retained in the cake after baking and is shown in a cake's height, lightness or the fluffiness of its texture. It was determined that the egg replacement formulations function substantially the same as whole eggs. It is believed that formulations having protein and fat content no less than that of the whole eggs are functionally interchangeable with the whole eggs in this and other baking applications.

Example 3

The blends of the invention were prepared for use as additives to natural whole eggs. The formulations for each blend and the weight percent of the blend ingredients with the whole eggs are shown in Table XI. Formulations that represent a 30%, 40% and 50% enhancement of the content of natural whole eggs, in blends with and without added fiber, were evaluated for nutritional content, performance and sensory comparisons to natural eggs.

TABLE XI

EGG ENHANCER - FORMULATIONS FOR SENSORY EVALUATIONS

| INGREDIENT | % | GRAMS |
|---|---|---|
| TEST-1 30% ENHANCEMENT | | |
| Whole Eggs | 70.00 | 210.00 |
| Water | 25.00 | 75.00 |

TABLE XI-continued

EGG ENHANCER - FORMULATIONS FOR SENSORY EVALUATIONS

| INGREDIENT | % | GRAMS |
|---|---|---|
| Soy Protein | 4.65 | 13.95 |
| Lecithin | 0.35 | 1.05 |
| TOTAL | 100.00 | 300.00 |
| TEST-2 40% ENHANCEMENT | | |
| Whole Eggs | 60.00 | 180.00 |
| Water | 33.33 | 99.99 |
| Soy Protein | 6.20 | 18.60 |
| Lecithin | 0.47 | 1.41 |
| TOTAL | 100.00 | 300.00 |
| TEST-3 50% ENHANCEMENT | | |
| Whole Eggs | 50.00 | 150.00 |
| Water | 41.66 | 124.98 |
| Soy Protein | 7.75 | 23.25 |
| Lecithin | 0.59 | 1.77 |
| TOTAL | 100.00 | 300.00 |
| TEST-4 30% ENHANCEMENT | | |
| Whole Eggs | 70.00 | 210.00 |
| Water | 24.99 | 74.97 |
| Soy Protein | 3.46 | 10.38 |
| Lecithin | 1.29 | 3.87 |
| Fiber | 0.26 | 0.78 |
| TOTAL | 100.00 | 300.00 |
| TEST-5 40% ENHANCEMENT | | |
| Whole Eggs | 60.00 | 180.00 |
| Water | 33.33 | 99.99 |
| Soy Protein | 4.61 | 13.83 |
| Lecithin | 1.72 | 5.16 |
| Fiber | 0.34 | 1.02 |
| TOTAL | 100.00 | 300.00 |
| TEST-6 50% ENHANCEMENT | | |
| Whole Eggs | 50.00 | 150.00 |
| Water | 41.66 | 124.98 |
| Soy Protein | 5.76 | 17.28 |
| Lecithin | 2.15 | 6.45 |
| Fiber | 0.43 | 1.29 |
| TOTAL | 100.00 | 300.00 |

TABLE XII

| TEST SAMPLE | PRODUCT |
|---|---|
| C-1 | CONTROL EGGS - C-1 |
| 1 | EGG ENHANCER-1 - 30% |
| 2 | EGG ENHANCER-2 - 40% |
| 3 | EGG ENHANCER-3 - 50% |
| C-2 | CONTROL EGGS - C-2 |
| 4 | EGG ENHANCER-4 - 30% |
| 5 | EGG ENHANCER-5 - 40% |
| 6 | EGG ENHANCER-6 - 50% |

Tests were conducted wherein control eggs, consisting of natural whole eggs, were compared to the formulations of Table XI. The controls were labeled C-1 and C-2. The formulations labeled as Test samples 1, 2, and 3 were compared to control C-1. The formulations labeled as Test samples 4, 5, and 6 were compared to control C-2. Test samples 1, 2 and 3, each comprising soy protein (S) and lecithin (L), were prepared by weighing each ingredient and combining the ingredients together in the amounts shown in Table X. Test samples 4, 5 and 6, each comprising soy protein (S), lecithin (L) and the digestion resistant soluble dietary fiber (F) were prepared, again by weighing each ingredient and combining the ingredients together, in the amounts shown in Table XI. As described with regard to Example 1, the dry ingredients may be combined in any order, but it has been found advantageous to place the protein in a container, add the lecithin to the protein and, if used, add the fiber to the protein and lecithin.

After the protein and lecithin for test samples 1-3 and the protein, lecithin and fiber for test samples 4-6 were added together, each sample was blended with water for about ten seconds in a laboratory Robot-Coupe® mixer. The weight percent of the water and the dry ingredients is set forth in Table XI. Each test sample was mixed with the water for one minute, and then added to an amount of natural liquid eggs.

Each mixture was cooked separately on a pre-heated grill at 350° F. (177° C.) for two minutes to make scrambled egg sample portions. After cooking, a portion of each scrambled egg portion was placed in a pre-labeled container. Another portion of each sample was placed side by side with the other test and control samples on a plate divided equally into labeled sections. The test samples and controls were observed for color, texture and odor by a sensory panel of two men and two women. Each test sample and control was tasted and organoleptically evaluated for mouth feel and flavor by the panel members.

The panel observed very small textural differences between and among the control samples and the test samples. Small color variations were observed, with the test samples exhibiting a slightly darker color. Although not required, if color is a concern, standard food coloring, such as FD & C yellow dye, may be added to have the enhanced egg blends produce a finished egg product closer in color to natural eggs. All panel members observed some flavor differences between the scrambled eggs prepared from the control eggs and the scrambled eggs prepared from the enhanced eggs. Some panelists found there to be a slight medicinal taste. It was found that the addition of salt or other commercially available flavorings would avoid any medicinal taste. None of the panelists found a soy taste or flavor in the scrambled eggs made from the enhanced eggs. It is believed that the use of alcohol washed soy protein accounts for the elimination of the soy bean flavor typically associated with soy protein in foods.

The blends of the invention can be packaged and used as an additive to natural liquid eggs to enhance the protein content and, if desired, the fiber content, while reducing the fat and cholesterol content per serving. The fat and cholesterol content are reduced in an egg product using the blends because the blend, together with any water added with the liquid whole egg, dilutes the cholesterol and fat. Each resulting serving size therefore has less cholesterol and fat than a serving size of the egg product made with undiluted natural eggs. The protein and fiber content on the other hand are increased, even though the natural egg is diluted because of the added protein and fiber in the blend. The blends of the invention therefore provide an additive for eggs or, with whole egg powder, an egg replacement product that includes all of the nutritional content of natural eggs plus the higher protein and fiber content offered by the blend and a lower cholesterol and fat content per serving size. The blends can be used in any application where one would use liquid eggs or whole egg powder in cooking or baking.

If desired, vitamins can be added to the blends to further enhance the nutritional value of the egg products made with the blends. Depending on the intended use for the blends, flavorings can be added to the blends.

The invention claimed is:

1. A composition comprising:
   an egg replacement product comprising a soy protein, lecithin and a digestion resistant maltodextrin soluble dietary fiber;
   flour; and
   whole egg powder present in major amounts, the soy protein is present in an amount less than the amount of the whole egg powder and the lecithin is present in an amount less than the amount of soy protein.

2. The composition of claim 1, wherein the soy protein is a non-modified soy protein concentrate derived from whole soybeans.

3. The composition of claim 1, wherein the soy protein is alcohol washed protein.

4. The composition of claim 1, wherein the lecithin is derived from soybean oil.

5. The composition of claim 1, wherein the lecithin is de-oiled lecithin.

6. A composition comprising:
   an egg replacement product comprising a soy protein, lecithin and a digestion resistant maltodextrin soluble dietary fiber;
   flour; and
   whole egg powder;
   the composition comprising 45-50% of the whole egg powder, 40-48% of the soy protein and 2-15% of the lecithin.

7. A composition comprising:
   an egg replacement product comprising a soy protein, lecithin and a digestion resistant maltodextrin soluble dietary fiber;
   flour; and
   whole egg powder;
   the composition comprising 38-42% of the whole egg powder, 38-42% of the soy protein, 4-8% of the lecithin and 10-17% of the digestion resistant maltodextrin soluble dietary fiber.

8. A method comprising:
   adding a soy protein, lecithin and a digestion resistant maltodextrin soluble fiber to liquid eggs; and
   mixing the soy protein, the lecithin and the digestion resistant maltodextrin soluble fiber with the liquid eggs.

9. The method of claim 8, further comprising adding an amount of water to the soy protein, the lecithin and the digestion resistant maltodextrin soluble fiber sufficient to allow the hydrated soy protein, lecithin and digestion resistant maltodextrin soluble fiber to approximate the viscosity of the liquid egg prior to the addition of the hydrated soy protein, lecithin and digestion resistant maltodextrin soluble fiber to the liquid egg.

10. The composition of claim 1, wherein the composition is in the form of a powder.

11. A method comprising:
    mixing a dry from of a soy protein concentrate, a dry form of lecithin, a dry form of a digestion resistant maltodextrin soluble fiber and whole egg powder, thus forming a dry mix;
    blending the dry mix with water, thus forming a hydrated blend; and incorporating the hydrated blend into a food product.

12. The method of claim 11, further comprising adjusting a viscosity of the hydrated blend such that the viscosity of the hydrated blend is similar to a viscosity of hydrated whole egg powder having a ratio of water to whole egg powder of 3.00:1.

* * * * *